United States Patent
Kuroyanagi et al.

[11] Patent Number: 6,154,583
[45] Date of Patent: Nov. 28, 2000

[54] OPTICAL SWITCH

[75] Inventors: Satoshi Kuroyanagi; Tetsuya Nishi; Takuji Maeda; Isao Tsuyama; Ichiro Nakajima, all of Kanagawa, Japan

[73] Assignee: Fujitsu Limited, Kawasaki, Japan

[21] Appl. No.: 09/114,937

[22] Filed: Jul. 14, 1998

[30] Foreign Application Priority Data

Feb. 20, 1998 [JP] Japan .................................. 10-038481

[51] Int. Cl.⁷ .............................. G02B 6/26; H04J 14/00
[52] U.S. Cl. .................. 385/16; 385/15; 385/17; 385/24; 385/42; 359/115; 359/124
[58] Field of Search ................. 385/15, 16, 17, 385/18, 19, 20, 21, 24, 42; 359/115, 124

[56] References Cited

U.S. PATENT DOCUMENTS

| | | | |
|---|---|---|---|
| 5,241,409 | 8/1993 | Hill et al. .................................. | 359/128 |
| 5,504,827 | 4/1996 | Schimpe ..................... | 385/24 |
| 5,739,935 | 4/1998 | Sabella ..................... | 359/128 |
| 5,991,476 | 11/1999 | Baney et al. ............................. | 385/16 |
| 6,005,698 | 12/1999 | Huber et al. ............................. | 359/117 |
| 6,034,800 | 3/2000 | Asahi ....................... | 359/128 |

FOREIGN PATENT DOCUMENTS

| | | | |
|---|---|---|---|
| 8-265807 | 10/1996 | Japan .................... | 385/16 X |
| 9-215017 | 8/1997 | Japan .................... | 385/16 X |
| 9-238370 | 9/1997 | Japan .................... | 385/16 X |
| 9-261236 | 10/1997 | Japan .................... | 385/16 X |

*Primary Examiner*—Brian Healy
*Attorney, Agent, or Firm*—Staas & Halsey, LLP

[57] ABSTRACT

If an optical switch unit configuring an optical switch is implemented by a three-stage circuit, optical amplifiers are arranged on the input and output sides of an optical space switch in a first stage, and the optical space switch and the optical amplifiers on both of the input and output sides are used as an expansion unit for expanding a switching capacity. Similarly, optical amplifiers are arranged on input and output sides of an optical space switch in a third stage, and the optical space switch and the optical amplifiers on both of the input and output sides are used as an expansion unit for expanding a switching capacity. Accordingly, there is no need to arrange extra optical amplifiers even at an initial setting when only part of a maximum switching capacity is used, thereby reducing an initial investment.

29 Claims, 14 Drawing Sheets

OPTICAL SWITCH

BACKGROUND OF THE INVENTION

1. Field of the Invention

The present invention relates to an optical switch for use in various optical systems, and more particularly to an optical switch having the configuration in consideration of the expandability of an optical switch unit or a wavelength selecting unit.

2. Description of the Related Art

As an information transfer speed becomes faster and the amount of information transferred becomes larger, the demands for a wider bandwidth and a larger capacity of a network and a transmission system have been increasing. As their implementation means, an optical network is desired to be built. The core technique for building the optical network is an optical transmission system.

FIGS. 1A and 1B are schematic diagrams showing the configurations of a typical optical network.

FIG. 1A shows an optical crossconnect (optical XC: optical switch) system for use in a single-wavelength optical transmission system. It is intended to accommodate a plurality of input/output optical transmission lines, and to route an optical signal input from an input optical transmission line to a desired output optical transmission line. Each optical signal input from each of input optical transmission lines 1300 is an optical signal having a single wavelength. The example shown in FIG. 1A assumes that the wavelength is λ0. In this configuration, all the wavelengths of the optical signals input from the respective input transmission lines 1300 may be λ0, or may differ depending on the respective transmission lines. However, the wavelengths of optical signals passing through one transmission line are identical because this is a single-wavelength optical transmission system.

Each optical signal input from each of the input optical transmission lines is input to an optical signal processing unit 1302, routed, and output to an output optical transmission line 1301. The optical signal processing unit 1302 is intended to switch an optical signal input from each of the input optical transmission lines 1300, and to output the switched signal to a desired output optical transmission line 1301. That is, the optical signal processing unit 1302 serves as a switch. Its switching capability is controlled by a controlling unit 1303. The controlling unit 1303 obtains the information about routing from an operating system of a network, determines which output optical transmission line 1301 an optical signal input from any of the input optical transmission lines 1300 is to be output to, and implements a desired switching capability by providing a control signal to the optical signal processing unit 1302.

FIG. 1B shows a wavelength-multiplexed optical XC system for use in a wavelength-multiplexing optical transmission system. This system is intended to accommodate a plurality of input/output optical transmission lines, and to route a wavelength-multiplexed optical signal input from an input optical transmission line to a desired output optical transmission line for each wavelength.

That is, this system realizes the switching capability where an optical signal processing unit 1307 routes an optical signal input from an input optical transmission line 1305 and outputs the signal to an output signal optical transmission line 1306 according to the instruction issued from a controlling unit 1308, similar to FIG. 1A. The differences from FIG. 1A are that an optical signal passing through one transmission line is composed of a plurality of wavelengths corresponding to a plurality of channels, and that the optical signal processing unit 1307 must route each optical signal having each of the plurality of wavelengths.

FIGS. 2A, 2B, 3A, and 3B show the typical configurations of the optical signal processing unit used in the wavelength-multiplexed optical XC system.

FIGS. 2A and 2B show the typical configurations of the optical signal processing unit in the wavelength-multiplexed optical XC system adopting an optical switch.

FIG. 2A shows the optical signal processing unit of a fixed wavelength type.

The optical signal input from an input line 1400 is defined to have multiplexed wavelengths λ1 through λn. The wavelength-multiplexed optical signal is input to a demultiplexer 1401 where the optical signal is demultiplexed into optical signals having respective wavelengths. The demultiplexed optical signals are input to an optical switch unit 1402, routed, and input to a multiplexer 1403. The multiplexer 1403 multiplexes the optical signals, and outputs the multiplexed signals to an output line as a wavelength-multiplexed optical signal. Since the configuration shown in FIG. 2A assumes a fixed wavelength type, the wavelength of the optical signal input from the input line 1400 is output without being converted, multiplexed by a multiplexer 1403, and output to an output line 1404. That is, the wavelength λ1 of an optical signal remains unchanged even when it is output to the output line 1404. As shown in FIG. 2A, a plurality of multiplexers 1403 are arranged in correspondence with a plurality of output lines 1404. However, two or more optical signals having identical wavelengths are not input to one of the plurality of multiplexers 1403. This is because wavelength-multiplexing is required for the optical signals. Accordingly, the optical switch unit 1402 performs routing so that, for example, only one optical signal having a wavelength λ1 is input to one of the plurality of multiplexers 1403.

FIG. 2B shows a typical configuration of the optical signal processing unit of a wavelength converting type. The same constituent elements as those shown in FIG. 2A are denoted by the same reference numerals.

The wavelength-multiplexed optical signal input from the input line 1400 is demultiplexed into optical signals having respective wavelengths by the demultiplexer 1401, and the demultiplexed signals are input to the optical switch unit 1402. The optical switch unit 1402 routes and outputs the optical signals having the respective wavelengths. Since the configuration shown in FIG. 2B is of the wavelength converting type, the optical switch unit 1402 performs routing regardless of the wavelength of an input optical signal. Therefore, if any optical signal output from the output port of the optical switch unit 1402 is input to the multiplexer 1403 where the optical signals are coupled, the coupled signal may contain two or more light beams having identical wavelengths. As a result, proper wavelength multiplexing may sometimes not be performed. Accordingly, a wavelength converting unit 1405 is arranged between the optical switch unit 1402 and the multiplexer 1403, so that the wavelengths of the optical signals to be input to one of the plurality of multiplexers 1403 are converted to be different. In the configuration shown in FIG. 2B, the wavelengths of respective optical signals to be input to each of the multiplexers 1403 are converted into λ1 through λn. Therefore, in the optical signal processing unit of the wavelength converting type, the input optical signal which initially has the wavelength λ1 is not always output as a signal whose wavelength is λ1 when it is output from each of the multiplexers 1403 to a transmission line. Which of the wavelengths λ1 through λn an optical signal has may vary depending on which wavelength the wavelength converting unit 1405 converts the optical signal into.

The optical switch units shown in FIGS. 2A and 2B are normally implemented by arranging 8×8 optical switches in a plurality of stages.

However, the optical signal processing unit can be configured without using an optical switch.

FIGS. 3A and 3B exemplify the configurations where the optical signal processing unit is implemented by using a wavelength selecting unit.

FIG. 3A exemplifies the configuration of the optical signal processing unit of the fixed wavelength type, to which a wavelength-multiplexed optical signal is input unchanged, for routing and outputting an optical signal having multiplexed wavelengths.

The wavelength-multiplexed optical signal is directly input from an input line 1500 to a wavelength selecting unit 1501, and is routed. Inside the wavelength selecting unit 1501, the optical signals are routed depending on each of the wavelengths. However, the wavelengths are not converted. Accordingly, an optical signal having a particular wavelength is routed as it is, wavelength-multiplexed, and is output to an output line 1502.

FIG. 3B exemplifies the configuration of the optical signal processing unit of the wavelength converting type. The same constituent elements as those shown in FIG. 3A are denoted by the same reference numerals.

In the configuration shown in FIG. 3B, a wavelength-multiplexed optical signal is input from the input line 1500 to the wavelength selecting unit 1501 unchanged. The wavelength selecting unit 1501 routes the wavelength-multiplexed optical signal depending on each of the wavelengths, and outputs the signals. Since the optical signal processing unit shown in FIG. 3B is of the wavelength converting type, it is not known from which output port of the wavelength selecting unit 1501 a particular optical signal input from the input line 1500 to the wavelength selecting unit 1501 will be output. That is, in the configuration shown in FIG. 3A, an optical signal having a particular wavelength is defined to pass through a particular route and optical signals having an identical wavelength are not wavelength-multiplexed. However, in the configuration shown in FIG. 3B, an optical signal is routed regardless of its wavelength. Therefore, if optical signals are coupled by making a correspondence between a particular output port of the wavelength selecting unit 1501 and one multiplexer 1504, optical signals having identical wavelengths may sometimes be coupled. Accordingly, the wavelength converting unit 1503 converts the wavelength of an optical signal and inputs the signal to the multiplexer 1504 so that the multiplexer 1504 does not couple optical signals having identical wavelengths.

As described above, also in the configuration shown in FIG. 3B, an optical signal having a particular wavelength when being input from the input line 1500 to the wavelength selecting unit 1501 does not always have the same wavelength when being transmitted from the output line 1502 to a transmission line.

The key to the implementation of the above described system is an optical switch unit or a wavelength selecting unit with a large capacity, and expandability (an increase of processing capacity without shutting down an optical signal being used. It is desirable that the amount of hardware increases in proportion to the number of increased ports from when an initial setting is made to when a capacity is increased to its maximum) is a vital factor.

As a means for expanding a capacity of a spatial switch, a multi-stage configuration, whose typical type is a three-stage configuration as proposed by Clos, is normally adopted. As a matter of course, such a configuration is also applied to an optical switch circuit network.

The configuration of the wavelength selecting unit in the wavelength-multiplexed optical XC system, for example, the configuration of the wavelength converting type is disclosed by Japanese Laid-open Patent Application (TOKUGANHEI) No. 8-019964 in detail.

In a conventional configuration, for example, as the method for expanding a three-stage circuit, the maximum number of switches in the second stage are installed from the start of the system, and the number of pairs of switches in the first and third stages is sequentially increased. As the method for expanding a five-stage circuit, the maximum number of switches in the third stage are installed from the start of the system, and the number of pairs of switches in the first and fifth stages, and the number of pairs of switches in the second and fourth stages, are respectively and sequentially increased.

For such a multi-stage switch circuit network, the maximum number of switches in an intermediate stage must be installed from the start of the system. Therefore, the amount of hardware at an initial setting becomes large, which leads to a problem in expandability.

However, in an optical switch circuit network, the loss in an optical signal (decrease of a power level) becomes larger as the switching capacity increases. Accordingly, an optical amplifier for compensating for the loss must be arranged in the switch circuit network. Also in such a case, an optical amplifier or optical amplifiers must be arranged in consideration of expandability, and the number of optical amplifiers should be sequentially increased according to the expansion of the switching capacity.

Also in the wavelength selecting unit, the loss in an optical signal (decrease of a power level) becomes larger as the processing capacity increases. Therefore, an optical amplifier must be arranged in the wavelength selecting unit in order to compensate for the loss. Also in this case, an optical amplifier or optical amplifiers must be arranged in consideration of the expandability, and the number of optical amplifiers should be sequentially increased according to the expansion of the processing capacity.

SUMMARY OF THE INVENTION

An object of the present invention is to provide an optical switch, where an optical amplifier for compensating for the loss in an optical signal is arranged in a form of full expandability, for suitably coping with a sequential increase in a switching capacity.

An optical switch in a first aspect of the present invention, to which a wavelength-multiplexed optical signal is input from a plurality of ports, routes the optical signal, and outputs the optical signal from a plurality of ports, comprises: a routing element for selectively routing an optical signal having a particular wavelength included in the input optical signal; and an optical amplifying unit for amplifying the input optical signal or an optical signal having a particular wavelength, wherein a combination of the routing element and the optical amplifying unit configure an expansion unit, and a number of expansion units to be arranged is increased, so that the switching capacity of the optical switch is increased.

An optical switch in a second aspect of the present invention, which is implemented by a three-stage optical switch circuit network, each of whose stages includes a plurality of optical space switches, comprises: optical amplifiers arranged at each input/output port of the optical space switches in the first and third stages, wherein the optical space switches and the optical amplifiers on both of the input/output sides of the optical space switches configure expansion units, so that the switching capacity of the optical switch is expanded.

An optical switch in a third aspect of the present invention, which is implemented by a three-stage optical switch circuit network each of whose stages includes a plurality of optical space switches, comprises: a 1×k ("k" is a natural number) optical switch arranged at each output port of the optical space switch in the first stage; and a k×1 optical switch arranged at each input port of the optical space switch in the third stage, wherein the 1×k and k×1 optical switches, which are connected to one optical space switch in the first and third stages, configure an expansion unit in the second stage, so that the switching capacity of the optical switch is expanded.

An optical switch in a fourth aspect of the present invention, which is implemented by a three-stage optical switch circuit network each of whose stages includes a plurality of optical space switches, comprises: an optical amplifier arranged at each input/output port of the optical space switches in the first and third stages; a 1×k ("k" is a natural number) optical switch arranged at each output port of the optical space switch in the first stage; and a k×1 ("k" is a natural number) optical switch arranged at each input port of the optical space switch in the third stage, wherein the 1×k and k×1 optical switches, which are connected to the expansion units in the first and third stages, are used as an expansion unit in the second stage, and the optical space switches and the optical amplifiers on both of the input and output sides of the optical space switches are used as the expansion units in the first and third stages, so that the switching capacity of the optical switch is expanded.

An optical switch in a fifth aspect of the present invention, which is implemented by a five-stage optical switch circuit network each of whose stages includes a plurality of optical space switches, comprises: a first optical amplifier that is arranged at each input/output port of the optical space switches in the first and fifth stages, and structures the expansion units in the first and fifth stages by being combined with the optical space switches; a second optical amplifier that is arranged at each output port of the optical space switch in the second stage and structures the expansion unit by being combined with the optical space switch; and a third optical amplifier that is arranged at each input port of the optical space switches in the fourth stage and structures the expansion unit by being combined with the optical space switches, wherein the switching capacity is expanded by sequentially increasing the numbers of the expansion units.

An optical switch in a sixth aspect of the present invention, which is implemented by a five-stage optical switch circuit network each of whose stages includes a plurality of optical space switches, comprises: a 1×k ("k" is a natural number) optical switch arranged at each output port of the optical space switch in the second stage; and a k×1 optical switch arranged at each input port of the optical space switch in the fourth stage, wherein the 1×k and k×1 optical switches, which are connected to the optical space switches in the second and fourth stages, are used as an expansion unit in the third stage, so that the switching capacity of the optical switch is expanded.

An optical switch in a seventh aspect of the present invention, which is implemented by a five-stage optical switch circuit network each of whose stages includes a plurality of optical space switches, comprises: a first optical amplifier that is arranged at each input/output port of the optical space switches in the first and fifth stages and structures the expansion units in the first and fifth stages by being combined with the optical space switches; a second optical amplifier that is arranged at each output port of the optical space switch in the second stage and structures the expansion units in the first and fifth stages by being combined with the optical space switches; a third optical amplifier that is arranged at each input port of the optical space switches in the fourth stage and structures the expansion unit by being combined with the optical space switches; a 1×k ("k" is a natural number) optical switch arranged at each output port of the optical space switches in the second stage; and a k×1 optical switch arranged at each input port of the optical space switches in the fourth stage, wherein the 1×k and k×1 optical switches, which are connected to the expansion units in the second and fourth stages, are used as an expansion unit in the third stage, so that the switching capacity of the optical switch is expanded by sequentially increasing the numbers of the expansion units.

An optical switch in an eighth aspect of the present invention, which includes a circuit for accommodating a plurality of input/output optical transmission lines and processing an input wavelength-multiplexed optical signal for each signal wavelength, comprises: a wavelength filter for selecting and outputting an optical signal having at least one wavelength from the wavelength-multiplexed optical signal; and an optical amplifier arranged at each input/output port of the wavelength filter, wherein the wavelength filter and the optical amplifier are combined and used as an expansion unit, so that the processing capacity of the optical switch is expanded by increasing the number of expansion units.

According to the present invention, in an optical switch using an optical space switch as a routing element, an optical space switch in a stage other than an intermediate stage in which the maximum number of switches are installed from the start of the system, is combined with an optical amplifier, so that not only the number of the optical space switches but also the optical amplifiers is increased as the switching capacity expands. As a result, there is no need to arrange unnecessary optical amplifiers when the required switching capacity is small in the first stage of the optical switch arrangement, thereby reducing an initial investment.

Additionally, an optical space switch in an intermediate stage is implemented by 1×k and k×1 switches, thereby enabling the intermediate stage to be expanded. As a result, the initial investment for the intermediate stage can also be reduced.

Furthermore, the expansion of the switching capacity of the optical switch adopting a wavelength filter can be flexibly coped with by using the wavelength filter and the optical amplifiers arranged before and after the wavelength filter as an expansion unit.

DESCRIPTION OF THE PREFERRED EMBODIMENTS

Figure 4:
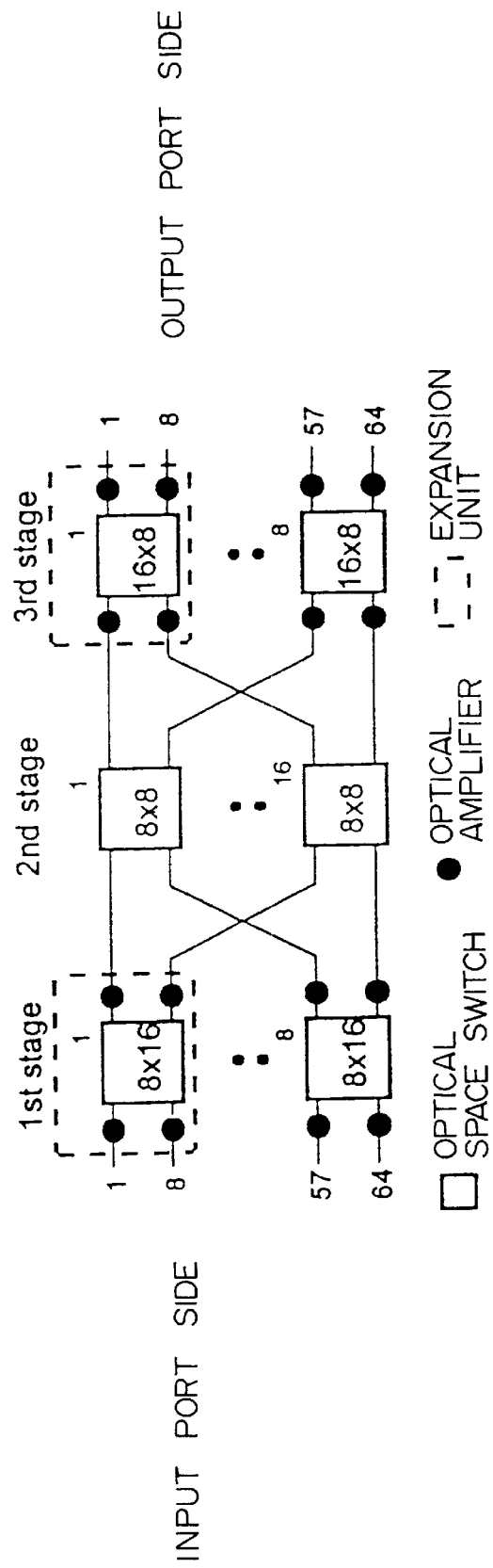
FIG. 4 is a schematic diagram exemplifying the structure of an optical switch unit in a three-stage circuit configuration (No. 1)
Figure 5:
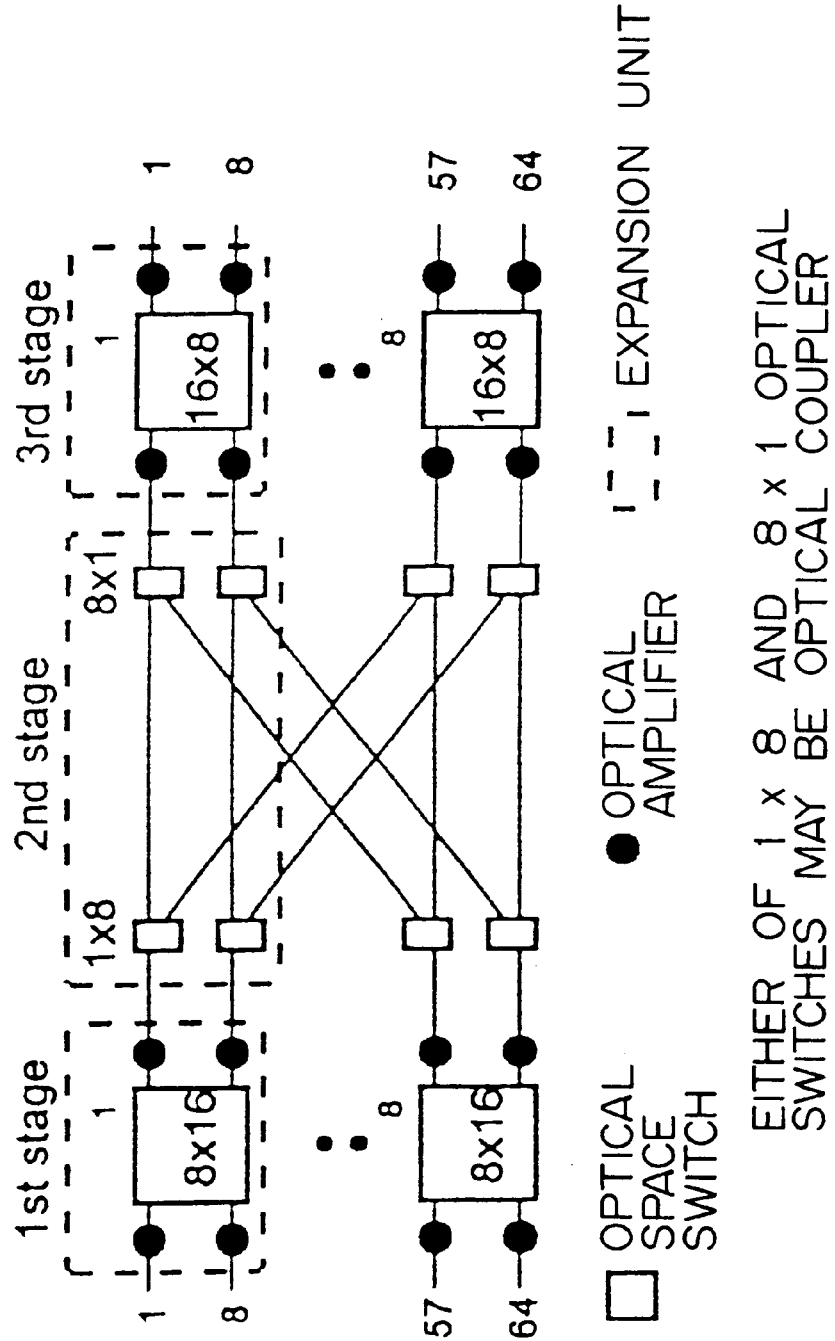
FIG. 5 is a schematic diagram exemplifying the structure of the optical switch unit in the three-stage circuit configuration (No. 2)
Figure 6:
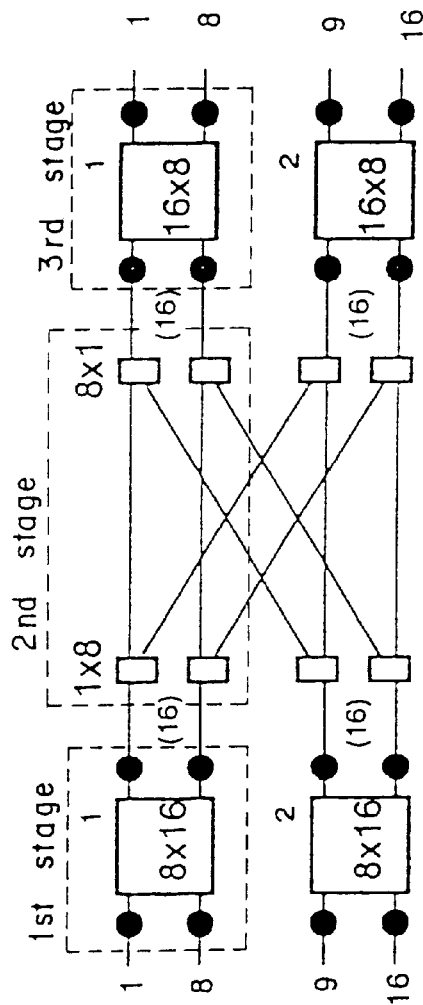
FIG. 6 is a schematic diagram exemplifying the structure of the optical switching unit in the three-stage circuit configuration (No. 3)

FIGS. 4 through 6 exemplify the structures of an optical switch unit in a three-stage circuit configuration.

FIG. 4 exemplifies the structure to which expandability is given by adding optical amplifiers.

If the optical switch unit is structured by optical switches (optical space switches), a loss arises in each of the optical switches. Therefore, an optical amplifier is needed at the succeeding stage of each of the optical switches in order to compensate for this loss. An optical amplifier is needed also on the input port side of the optical switch unit in order to compensate for the loss caused in a transmission line when an optical signal is input to the optical switch unit. In this figure, the size of the entire optical switch unit is assumed to be 64×64. However, the size is not limited to this implementation.

For the optical signal input from the input port side, the loss caused in the transmission line is first compensated for by an optical amplifier. The signal is then input to an optical switch in the first stage. The optical signal input to the optical switch is output from any of the 16 output ports of the optical switch in the first stage according to the instruction issued from a control circuit, not shown in FIG. 4, and amplified by an optical amplifier, and the loss caused in the optical switch in the first stage is compensated for. The 16 output ports of the optical switch in the first stage respectively correspond to the 16 optical switches in the second stage. The optical signal output from the first stage is input to any of the 16 optical switches in the second stage, and is routed. The output port of one of the optical switches in the second stage corresponds to 8 optical switches in the third stage. The loss in the optical signal output from the second stage, which is caused in the optical switch in the second stage, is compensated for by an optical amplifier, and the optical signal is input to any of the 8 optical switches in the third stage. The optical signal is then switched by the optical switch in the third stage, amplified by an optical amplifier, and transmitted to the outside of the optical switch unit.

The above explanation is provided based on the assumption that the number of optical switch units is increased to its maximum. If the switching capacity is of a much smaller amount, the numbers of the expansion units in the first and third stages are decreased, so that some of the input and output ports of the optical switches in the second stage are not used. Since the operations in this case are also fundamentally the same as those referred to in the above explanation, their explanation is omitted here.

FIG. 4 shows a total of 4 locations at which optical amplifiers are arranged: the location on the input port side (in order to compensate for the loss caused in the transmission line), the location between the switches of the first and second stages (in order to compensate for the loss caused in the switch in the first stage), the location between the second and third stages (in order to compensate for the loss caused in the switch in the second stage), and the location on the output port side (in order to compensate for the loss caused in the switch in the third stage). As described above, the maximum number of switches in the second stage must be installed from the start of the system for the three-stage circuit. Therefore, optical amplifiers are arranged at each input/output port of the optical switches in the first and third stages, and an optical amplifier, an optical switch, and an optical amplifier are sequentially added to configure an expansion unit. For the expansion, the required numbers of optical switches (8×16 and 16×8 optical switches in this figure) are arranged in the first and third stages, and respectively connected to the previously arranged 8×8 optical switches in the second stage.

As described above, by combining the optical switches and the optical amplifiers whose numbers can be changed depending on the switching capacity of an optical switch and using the combination of the switch and the amplifiers as an expansion unit, it is sufficient for a minimum number of optical amplifiers to be arranged. Since the maximum number of optical switches in the second stage must be installed from the start of the system when optical amplifiers are arranged by being combined with the optical switches in the second stage, the number of optical amplifiers must be the same as that of the ports of the maximum number of the optical switches in the second stage, and must be arranged regardless of whether or not all of the optical amplifiers are used. Therefore, optical switches that are not actually used must still be arranged, which leads to a wasteful initial investment. If optical amplifiers are combined with the optical switches in the first and third stages, the number of optical amplifiers can be reduced to a minimum. Consequently, it can save the wasteful initial investment.

FIG. 5 exemplifies the configuration where expandability is provided even to the number of switches in the second stage in a conventional three-stage circuit configuration.

Specifically, each output port of each of the switches in the first stage is connected with a 1×8 switch, while each input port of each of the switches in the third stage is connected with a 8×1 switch. The 8 output ports of the 1×8 switches are respectively connected to one of the input ports of the 8 8×1 switches. At this time, the 8 input ports of the 8×1 switches are respectively connected to 8 different switches in the first stage. Each of the optical switches in the first and third stages is used as an expansion unit, and the 1×8 optical switches (the number of which is 16) in the second stage and the 8×1 optical switches (the number of which is 16), which are connected to the expansion units in the first and third stages, are sequentially added as expansion units. Here, the explanation is provided by taking the 1×8 and 8×1 switches or 8×16 and 16×8 switches as examples. Actually, m1×m2 and m2×m1 switches (m1≧2×m2−1: this indicates a non-blocking condition) or 1×k and k×1 switches ("k" is a natural number) can be used.

In the configuration shown in FIG. 5, the optical amplifiers are added. The locations at which the optical amplifiers are arranged are those on the input and output sides of the optical switches (optical space switches) in the first and third stages. Accordingly, similar to FIG. 4, the expansion unit of the first and third stages is an optical switch and optical amplifiers arranged on the input/output sides of the optical switch. As described above, waste in an initial investment can be saved since there is no necessity to arrange extra optical amplifiers, and at the same time, the expansion unit can be arranged also in the second stage by making the configuration of the second stage different from that of FIG. 4. Accordingly, the number of expansion units in the second stage may be increased when expansion is needed without arranging the maximum number of optical switches in the second stage from the start of the system for future expansion as shown in FIG. 4. Compared with FIG. 4, waste of the initial investment is further saved.

Similar to FIG. 4, the optical amplifiers with the optical switch in the first or third stage are configured as an expansion unit. Since the expansion unit can also be configured in the second stage in FIG. 5, both the optical amplifier on the output side of each of the optical switches in the first stage and the optical amplifier on the input side of each of the optical switches in the third stage may be also included in the expansion unit of the second stage. That is, the optical amplifier on the output side of each of the optical switches in the first stage is arranged on the input side of each of the 1×8 switches in the second stage, while the optical amplifier on the input side of the each of the optical switches in the third stage is arranged on the output side of each of the 8×1 switches in the second stage, thereby configuring the expansion unit.

FIG. 6 is a schematic diagram showing the expansion of the configuration shown in FIG. 5.

This figure depicts the configuration when the size of the switch is set to 16×16 in the configuration of the 64×64 switch shown in FIG. 5.

In the configuration shown in FIG. 6, two expansion units are arranged in the first stage, and two expansion units are also arranged in the second and third stages in a similar manner. If the 64×64 switch is arranged as shown in FIG. 5, 8 expansion units are arranged in the respective stages. In the configuration shown in FIG. 6, the minimum switching capacity is 8×8, and one expansion unit is respectively arranged in the first, second, and third stages. At this time, only one output port is actually used among the 8 output ports of the 1×8 switch. Similarly, only one input port is actually used among the 8 input ports of the 8×1 switch. If the 8×8 switch is expanded to a 16×16 switch, one expansion unit is respectively added to the first, second, and third stages, and the 1×8 and 8×1 switches in the second stage are connected to different expansion units. At this time, only two output ports are actually used among the output ports of the 1×8 switch, and also only two input ports are actually used among the input ports of the 8×1 switch. In this way, the number of expansion units in the respective stages is sequentially increased in order to add a switch, and at the same time, the output ports of the 1×8 switch and the input ports of the 8×1 switch in the second stage are respectively and newly connected. FIG. 5 shows the case where the switching capacity is increased to its maximum. Although FIG. 5 does not illustrate all of expansion units, 8 expansion units are actually arranged in the respective stages. All of the output ports of the 1×8 switch and also all of the input ports of the 8×1 switch in the second stage are used.

Note that the 1×8 switch shown in FIG. 6 outputs an input optical signal to any of the 8 output ports, while the 8×1 switch outputs one of the optical signals input from the 8 input ports to the output port. Therefore, either of the 1×8 and 8×1 switches may be a 1×8 or 8×1 optical coupler.

The explanations about the switching capacity of each of the optical switches in FIGS. 5 and 6 are provided by using particular values as examples. However, an optical switch with an arbitrary switching capacity may be used as referred to in the explanation of FIG.4.

Figure 7:
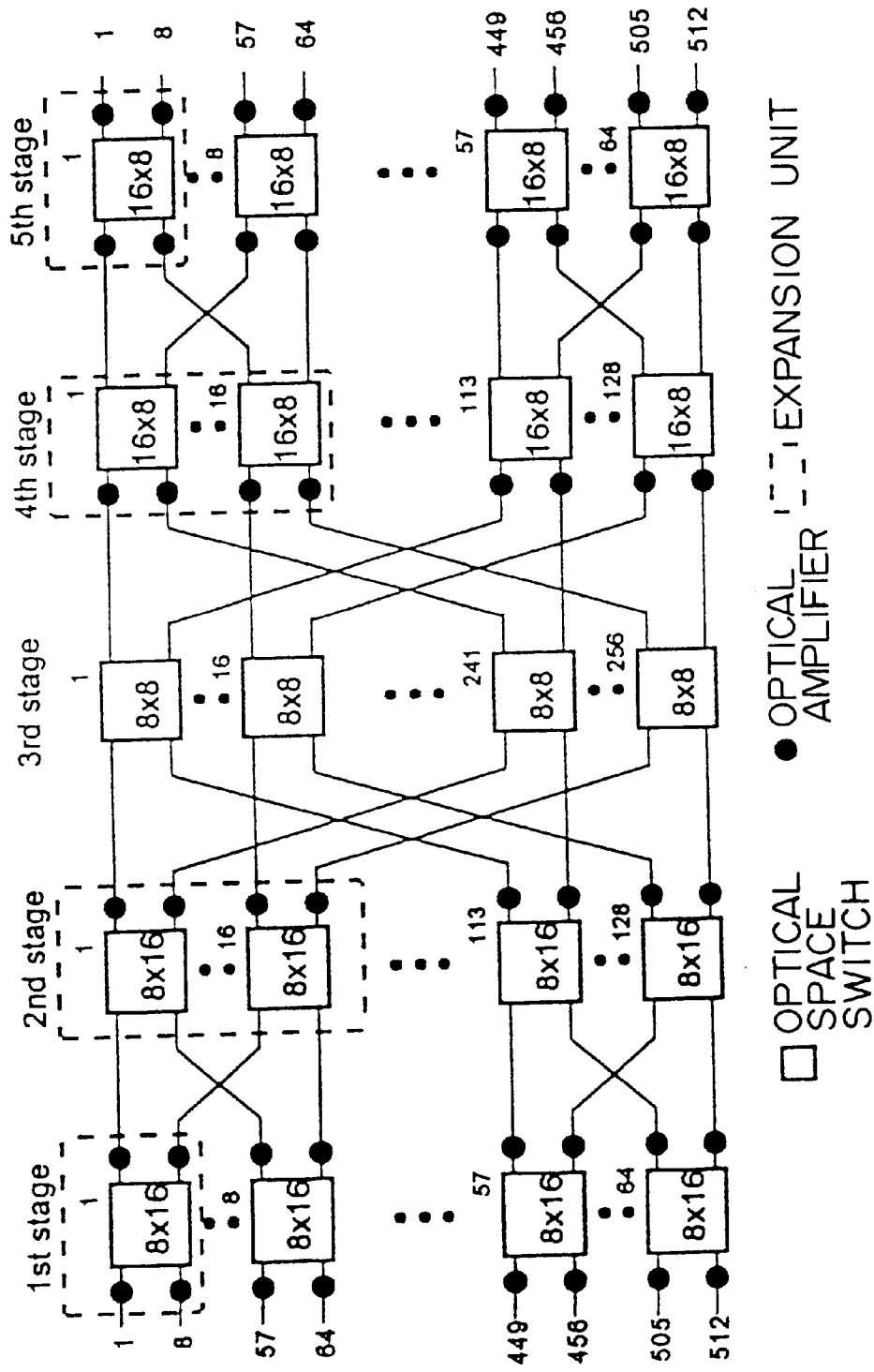
FIG. 7 is a schematic diagram exemplifying the configuration when a five-stage circuit is adopted as an optical switch unit (No. 1)
Figure 8:
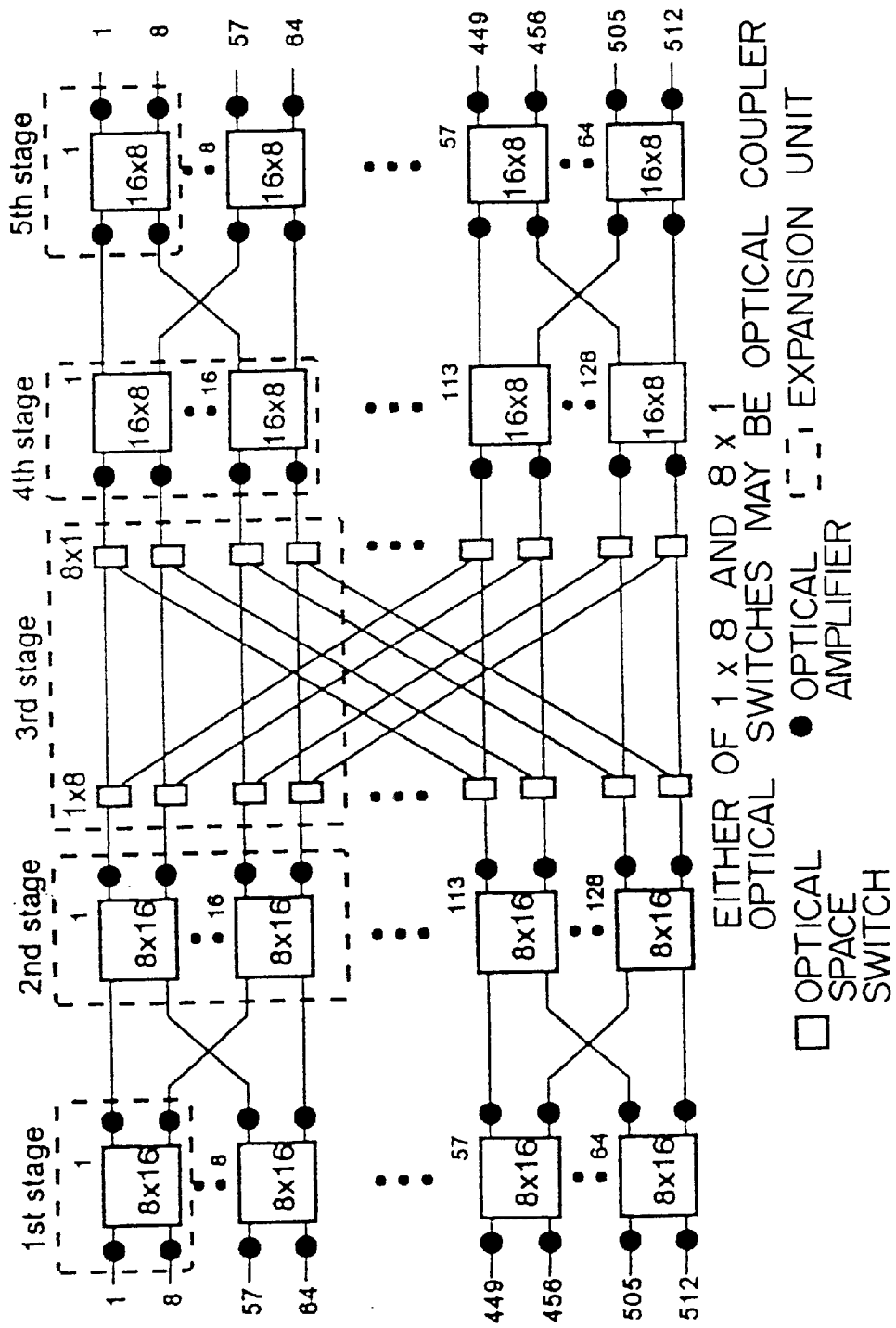
FIG. 8 is a schematic diagram exemplifying the configuration when the five-stage circuit is adopted as the optical switch unit (No. 2)

FIGS. 7 and 8 exemplify the configurations where a five-stage circuit is adopted as an optical switch unit.

FIG. 7 exemplifies the configuration where expandability is added to a conventional five-stage circuit.

There are a total of 6 locations at which optical amplifiers are arranged: the location on the input port side (in order to compensate for the loss caused in a transmission line), the location between the first and second stages (in order to compensate for the loss caused in the switch in the first stage), the location between the second and third stages (in order to compensate for the loss caused in the switch in the second stage), the location between the third and fourth stages (in order to compensate for the loss caused in the switch in the third stage), the location between the fourth and fifth stages (in order to compensate for the loss caused in the switch in the fourth stage), and the location on the output port side (in order to compensate for the loss caused in the switch in the fifth stage). In the five-stage circuit, all switches in the third stage must be prepared beforehand like those in the second stage of a three-stage circuit. Therefore, an optical amplifier is arranged at each input/output port of the optical switches in the first and fifth stages, at each output port of the optical switches in the second stage, and at each input port of the optical switches in the fourth stage. The numbers of expansion units (in the first and fifth stages) composed of an optical amplifier, an optical switch, and an optical amplifier, expansion units (in the second stage) which are connected to the expansion units in the first stage and are composed of an optical switch and an optical amplifier, and expansion units (in the fourth stage) which are connected to the expansion units in the fifth stage and are composed of an optical amplifier and an optical switch, are sequentially increased. For example, one expansion unit must be added in the second and fourth stages each time the number of added input/output ports exceeds 64 in FIG. 7. However, one expansion unit must be added in the first and fifth stages each time the number of added input/output ports exceeds 8.

As described above, the switching capacity of respective optical switches can be suitably set by a designer, and is not limited to the implementations shown in the configuration of FIG. 7.

FIG. 8 exemplifies the configuration where expandability is given also to the switches in the third stage of the conventional five-stage configuration.

Specifically, each output port of each of the switches in the second stage is connected with a 1×8 switch, while each input port of each of the switches in the fourth stage is connected with a 8×1 switch. The 8 output ports of the 1×8 switch are respectively connected to one of the input ports of the 8×1 switch in 8 different expansion units. At this time, the input ports of the 8×1 switch are respectively connected to the optical switches in the 8 different expansion units.

If optical amplifiers are not included, an expansion unit composed of an optical switch (in the first and fifth stages), an expansion unit (in the second stage) which is connected to the expansion unit in the first stage and is composed of an optical switch, an expansion unit (in the fourth stage) which is connected to the expansion unit in the fifth stage and is composed of an optical switch, and an expansion unit (in the third stage) which is connected to the expansion units in the second and fourth stages and is composed of 1×8 optical switches (the number of which is 256) and 8×1 optical switches (the number of which is 256), are sequentially added.

If optical amplifiers are added, in the first stage, one expansion unit is composed of one 8×16 switch and the optical amplifiers arranged on the input/output sides of the switch. Similarly, in the fifth stage, one expansion unit is composed of one 16×8 switch and the optical amplifiers arranged on the input/output sides of the switch. In the second stage, one expansion unit is composed of 16 8×16 switches and the optical amplifier arranged on the output side of each of the 8×16 switches. Similarly, in the fourth stage, one expansion unit is composed of 16 16×8 switches and the optical amplifier arranged on the input side of each of the 16×8 switches. In the third stage, one expansion unit is composed of 256 1×8 switches, the number of which is the same as that of the output ports of the 8×16 switches included in the expansion unit in the second stage, and 256 8×1 switches, the number of which is the same as that of the input ports of the 16×8 switches included in the expansion unit in the fourth stage.

Note that optical amplifiers are not always required to be arranged as shown in FIG. 8. The optical amplifier on the output side of each of the 8×16 switches in the expansion unit in the second stage may be embedded into the expansion unit in the third stage by being arranged on the input side of each of the 1×8 switches in the third stage. Similarly, the optical amplifier on the input side of each of the 16×8 switches in the expansion unit in the fourth stage may be embedded into the expansion unit in the third stage by being arranged on the output side of each of the 8×1 switches in the third stage. Additionally, although an initial investment slightly increases, the optical amplifier on the output side of the 8×16 switch in the first stage and the optical amplifier on the input side of the 16×8 switch in the fifth stage may be respectively embedded into the expansion units in the second and fourth stages.

Figure 9A:
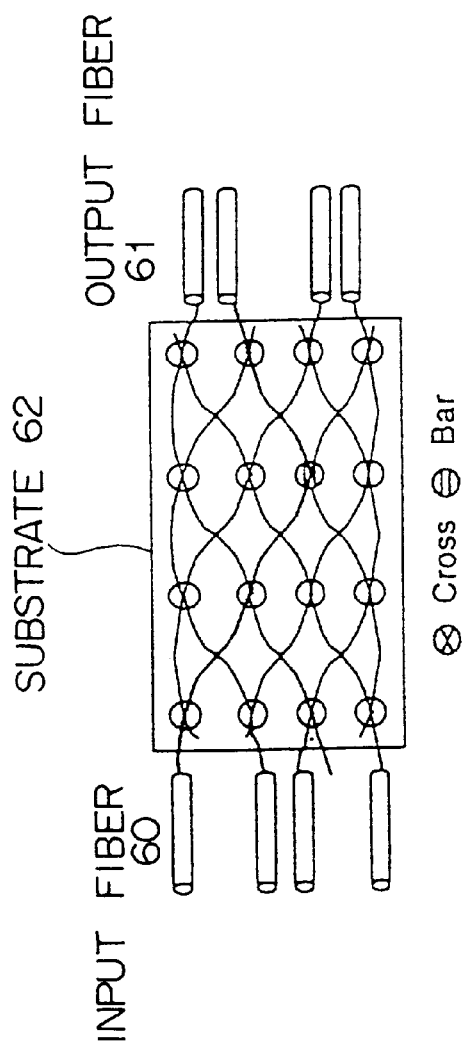
FIGS. 9A and 9B are schematic diagrams exemplifying the structure of an optical space switch, and the structure of a k×2k (2k×k) optical space switch.
Figure 9B:
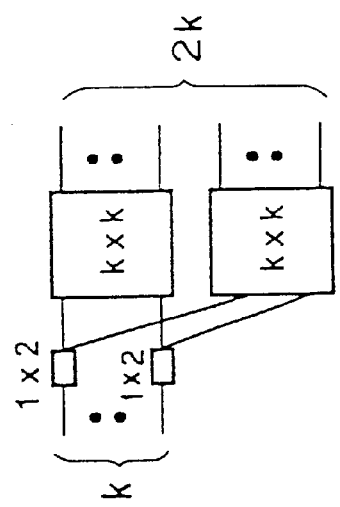

FIGS. 9A and 9B exemplify the structures of an optical space switch and a k×2k (2k×k) optical space switch.

In FIG. 9A, "Cross" indicates that the paths of optical signals intersect each other, while "Bar" indicates that the paths are parallel. Whether the path of an optical signal at each intersecting point becomes either "Cross" or "Bar" is determined by a control signal provided from a control circuit, not shown in this figure.

The optical space switch shown in FIG. 9A is one example of the structure available as a fundamental unit of each of the optical switches shown in FIGS. 4 through 8. The structure shown in FIG. 9A adopts a 4×4 switch as an example. As shown in this figure, the optical space switch forms optical waveguides which intersect each other on a substrate 62, and the path of an optical signal can be changed by applying a voltage, etc. to an intersecting point (encircled in this figure). The voltage, etc. to be applied to the intersecting point on each waveguide is generated by a driving circuit, not shown in FIG. 9A. Each optical waveguide formed on the substrate 62 has an optical signal input from an input fiber 60. The input optical signal passes through each waveguide while its path is switched at each intersecting point, and is transmitted to a desired output fiber 61 according to the control of the driving circuit.

Depicted in FIG. 9A is the example of the structure of the 4×4 switch. However, an optical space switch with a larger switching capacity may be used.

The details of the optical space switch shown in FIG. 9A are recited, for example, by the Japanese Patent Publication (TOKKOHEI) No. 6-66982.

FIG. 9B shows the method for structuring a k×2k or 2k×k ("k" is a natural number) switch by using the optical space switch shown in FIG. 9A.

As described above, when an optical XC is configured, the number of output ports of the optical switch used for the optical XC must be double the number of input ports in order to prevent the blocking of an input optical signal, that is, to prevent the incapability of outputting the input optical signal despite the existence of an output port. Accordingly, when an optical switch having "2k" output ports to "k" input ports is used for an optical XC, a non-blocked optical XC can be configured.

To structure the k×2k or 2k×k optical switch by using the k×k optical space switch shown in FIG. 9A, two k×k optical space switches and two 1×2 optical switches may be used. As the 1×2 optical switches, for example, the optical switch where the portion for electrically switching the route of an optical signal is arranged at a branching point of a Y-branch waveguide may be used.

"k" input optical signals are input to any of k×k switches by the 1×2 switch arranged for each input. This control is performed via a driving circuit, not shown in the drawings, according to the instruction issued from a control circuit, not shown in the drawings. An optical signal switched by the 1×2 switch is further switched by the k×k switch to which the optical signal is input, and then output to any of the "2k" outputs.

A 2k×k switch can be easily obtained by inverting and using the input as the output of FIG. 9B.

Figures 1A, 1B:
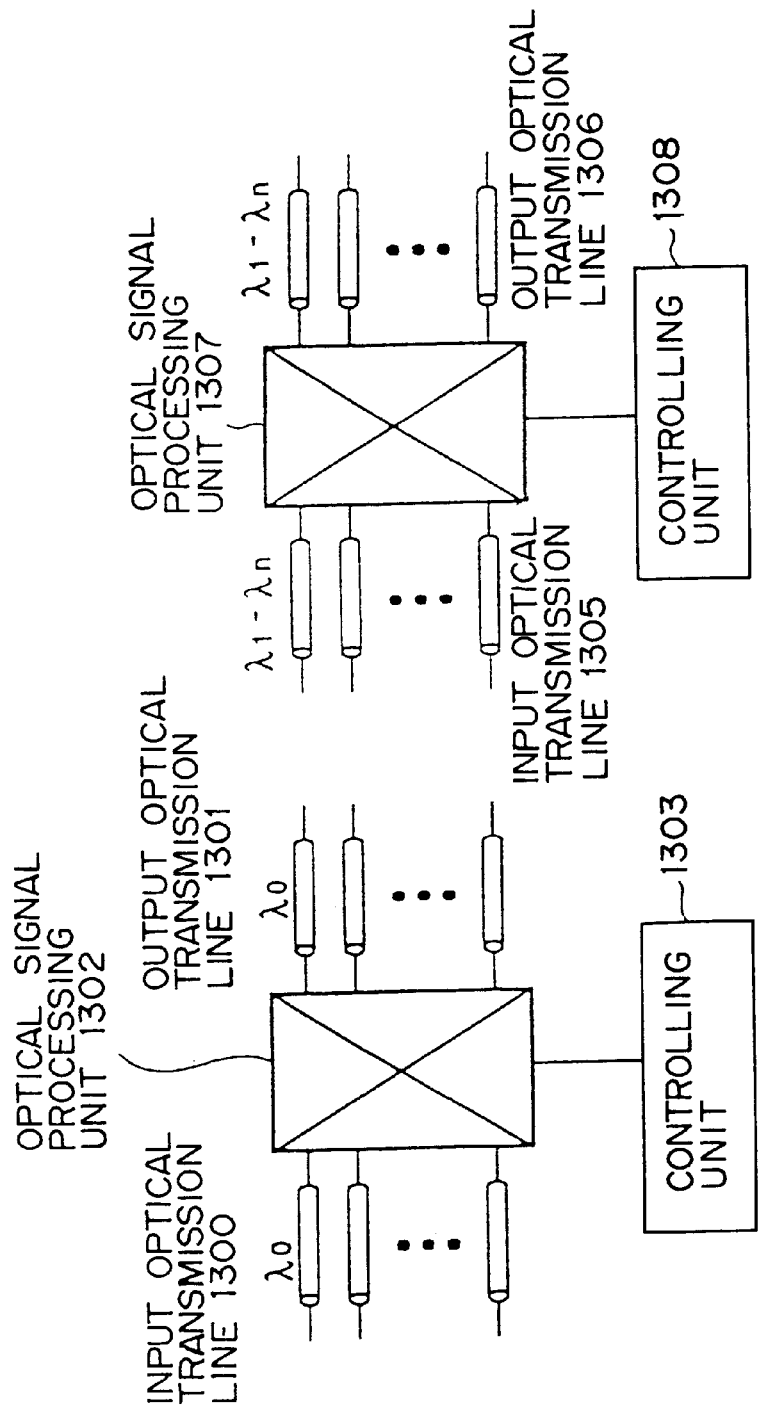
FIGS. 1A and 1B are schematic diagrams showing the configurations of a typical optical network.
Figures 2A, 2B:
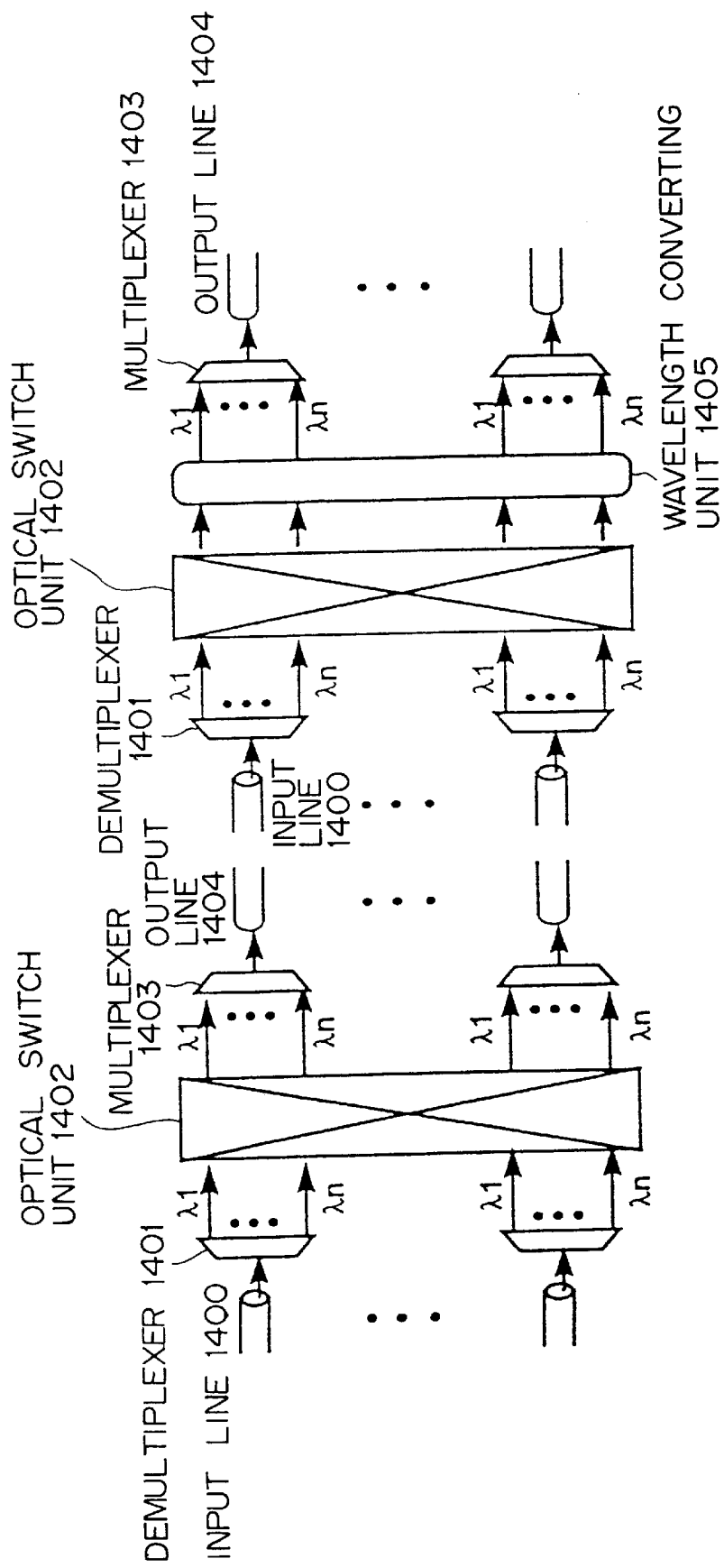
FIGS. 2A and 2B are schematic diagrams showing the typical configurations of an optical signal processing unit in a wavelength-multiplexed optical XC system (No.1)
Figures 3A, 3B:
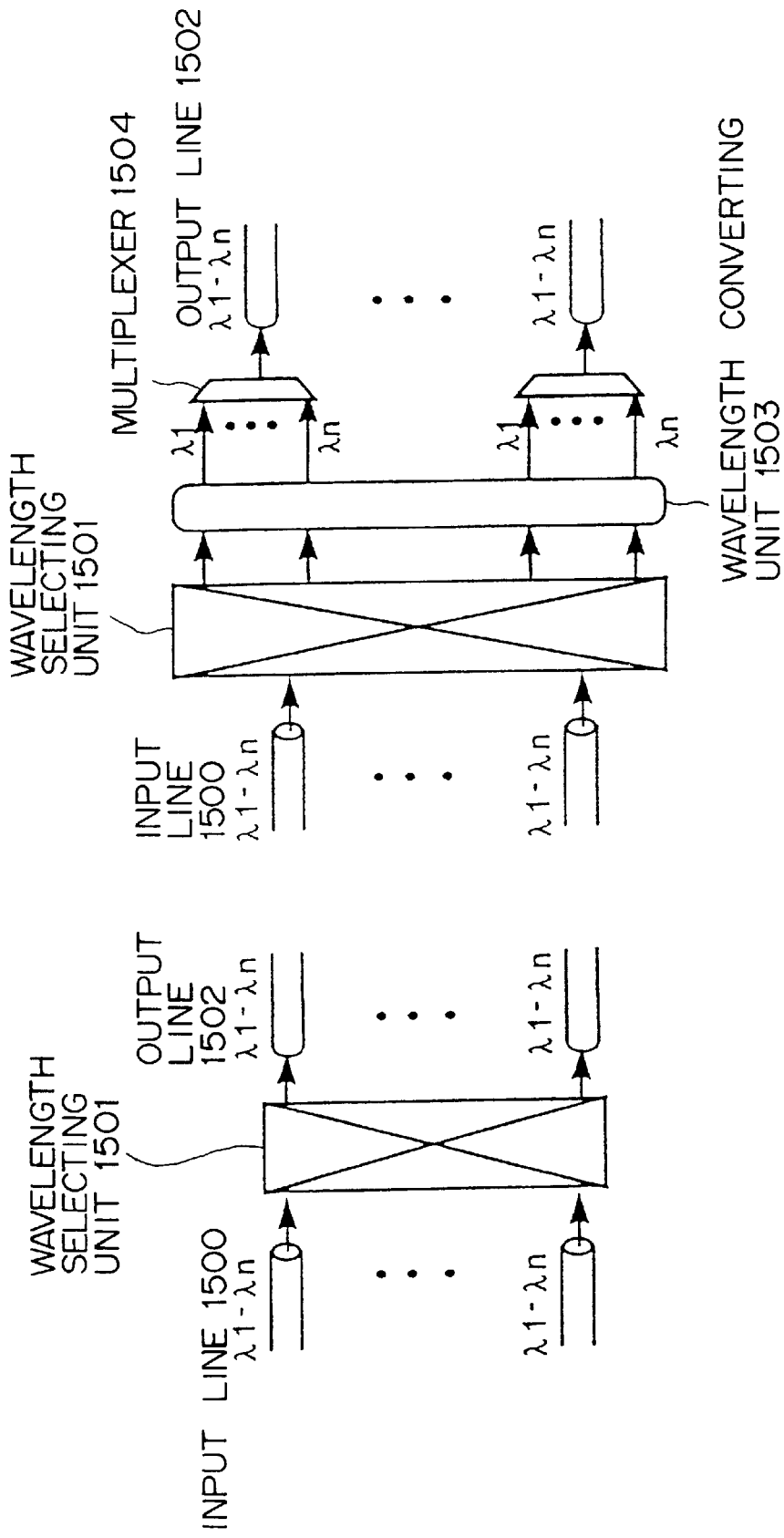
FIGS. 3A and 3B are schematic diagrams showing the typical configurations of the optical signal processing unit in the wavelength-multiplexed optical XC system (No.2)
Figure 10:
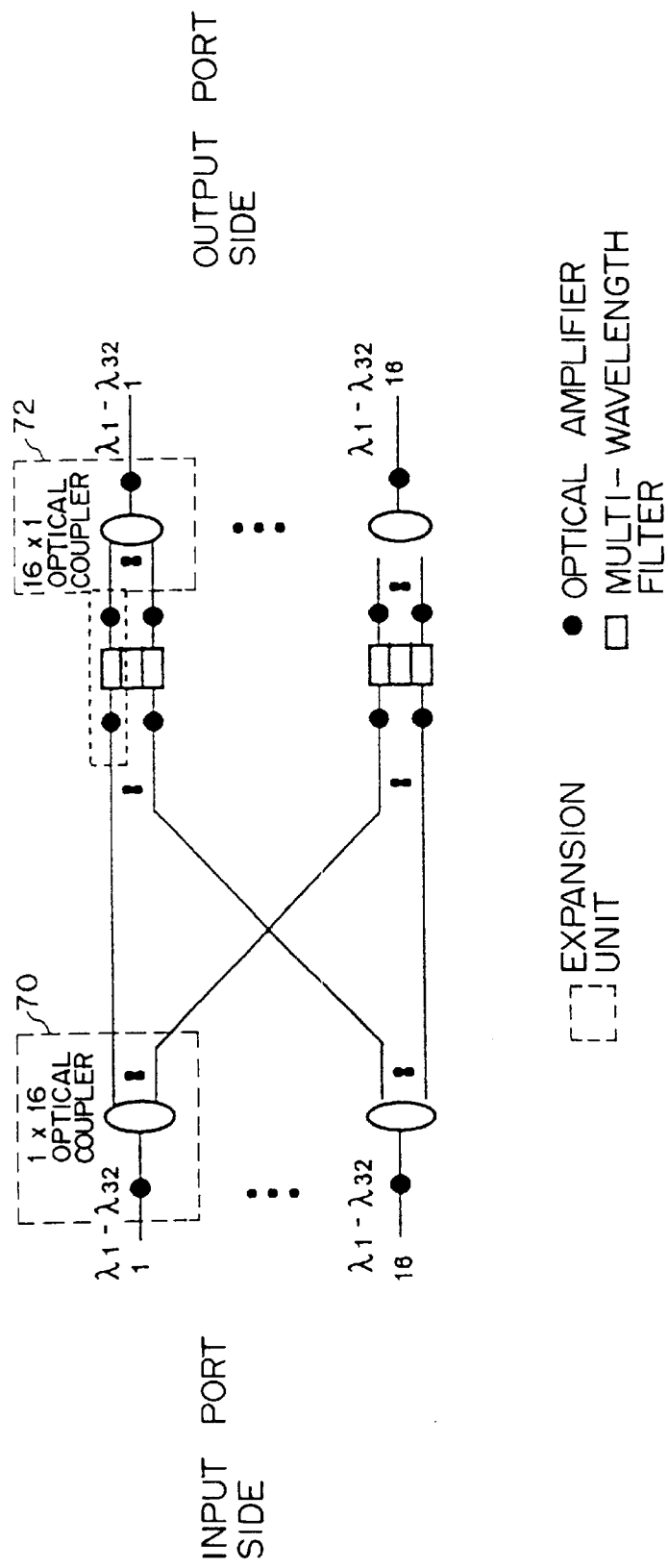
FIG. 10 is a schematic diagram exemplifying the configuration of a wavelength selecting unit including optical amplifiers in the wavelength fixed optical XC system shown in FIG. 3A.

FIG. 10 exemplifies the structure of a wavelength selecting unit including optical amplifiers in the fixed wavelength optical XC system shown in FIG. 3A.

The wavelength selecting unit shown in FIG. 10 has the structure where both the numbers of input and output ports are 16. Optical signals having wavelengths λ1 through λ32 are multiplexed and input from the respective input ports. Also, the optical signals having the wavelengths λ1 through λ32 are multiplexed and output from the respective output ports. The wavelength-multiplexed optical signal input from the input port side is split by a 1×16 optical coupler 70. The reason why the optical coupler 70 has the 1×16 configuration is that the number of output ports is 16. The optical signal to be input to the 1×16 optical coupler is amplified by an optical amplifier before being split by the 1×16 optical coupler 70. This amplification is performed in order to compensate for the loss caused by the propagation in a transmission line. The optical signal split by the 1×16 optical coupler 70 is again amplified by an optical amplifier, and then input to a multi-wavelength filter. The amplification by the optical amplifier at this time is performed in order to compensate for the loss caused in the 1×16 optical coupler 70. The multi-wavelength filter selects the optical signal having a desired wavelength (an optical signal having one or more arbitrary wavelengths) from among the input optical signals, outputs the selected signal, and inputs it to a 16×1 optical coupler 72. The role of the optical amplifier at this time is to compensate for the loss caused in the multi-wavelength filter.

The reason why the optical coupler 72 has a 16×1 configuration is that the number of input ports is 16. The respective optical signals input to the 16×1 optical coupler 72 are coupled, so that the coupled optical signal is input as a wavelength-multiplexed optical signal having wavelengths λ1 through λ32.

The explanation about this figure is provided by using the 1×16 and 16×1 optical couplers. However, if the numbers of output and input ports are respectively "k", a 1×k or k×1 optical coupler can be normally used as an optical coupler configuration.

There are a total of four locations at which optical amplifiers are arranged: the location on the input port side (in order to compensate for the loss caused in a transmission line), the location between the 1×16 optical coupler 70 and the multi-wavelength filter (in order to compensate for the loss caused in the 1×16 optical coupler), the location between the multi-wavelength filter and the 16×1 optical coupler 72 (in order to compensate for the loss caused in the multi-wavelength filter), and the location on the output port side (in order to compensate for the loss caused in the 16×1 optical coupler 72). Here, the multi-wavelength filter is intended to select a plurality of desired wavelengths from the input wavelength-multiplexed optical signal. As an example of a multi-wavelength filter, an acousto-optic filter can be cited. In this configuration, a multi-wavelength filter must be added with an increase in the number of ports. Therefore, an optical amplifier is arranged at each input/output port of the multi-wavelength filter, and expansion units consisting of an optical amplifier, a multi-wavelength filter, and an optical amplifier con be sequentially added. Furthermore, as the expansion units for increasing the number of ports, an optical amplifier and a 1×16 optical coupler, and a 16×1 optical coupler and an optical amplifier, are respectively used, thereby increasing the number of ports.

Figure 11:
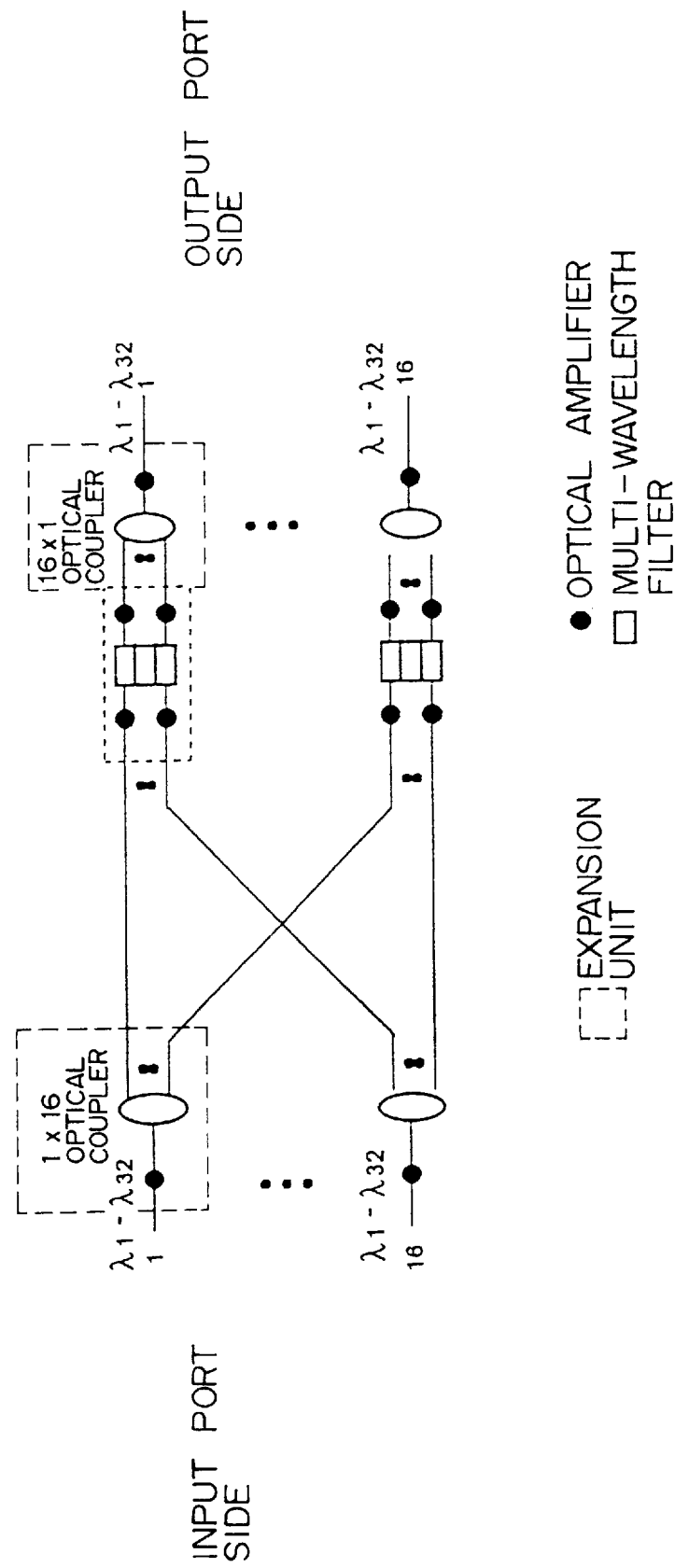
FIG. 11 is a schematic diagram exemplifying the configuration where an optical amplifier, a multi-wavelength filter, and an optical amplifier, which are included in the configuration shown in FIG. 10, are manufactured with an integration technique.

FIG. 11 exemplifies the structure where an optical amplifier, a multi-wavelength filter, and an optical amplifier included in the structure shown in FIG. 10 are manufactured with an integration technique. In the structure shown in this figure, and expansion units consisting of an optical amplifier and a 1×16 optical coupler, and a 16×1 optical coupler and an optical amplifier, can be sequentially added to increase the number of ports, and at the same time, a plurality of multi-wavelength filters and the optical amplifiers before and after the filters are used as one expansion unit.

In FIG. 10, the expansion unit is set on the basis of one multi-wavelength filter. However, the expansion unit shown in FIG. 11 can also be set if a plurality of multi-wavelength filters are integrated into one optical module by using an integration method.

Since the 1×16 and 16×1 configurations are used as an optical coupler in FIGS. 10 and 11, the maximum number of input/output ports is 16. However, when the optical coupler is structured to be 1×k or k×1 ("k" is a natural number) as described above, the number of input/output ports can be increased up to "k".

The arrangement of optical amplifiers is the same as that referred to in the explanation of FIG. 10. The optical amplifier in the preceding stage of the 1×16 optical coupler is intended to compensate for the loss that an optical signal undergoes in a transmission line. The optical amplifier in the preceding stage of the multi-wavelength filter is intended to compensate for the loss caused in the 1×16 optical coupler, while the optical amplifier in the following stage of the multi-wavelength filter is intended to compensate for the loss caused in the multi-wavelength filter.

Figure 12:
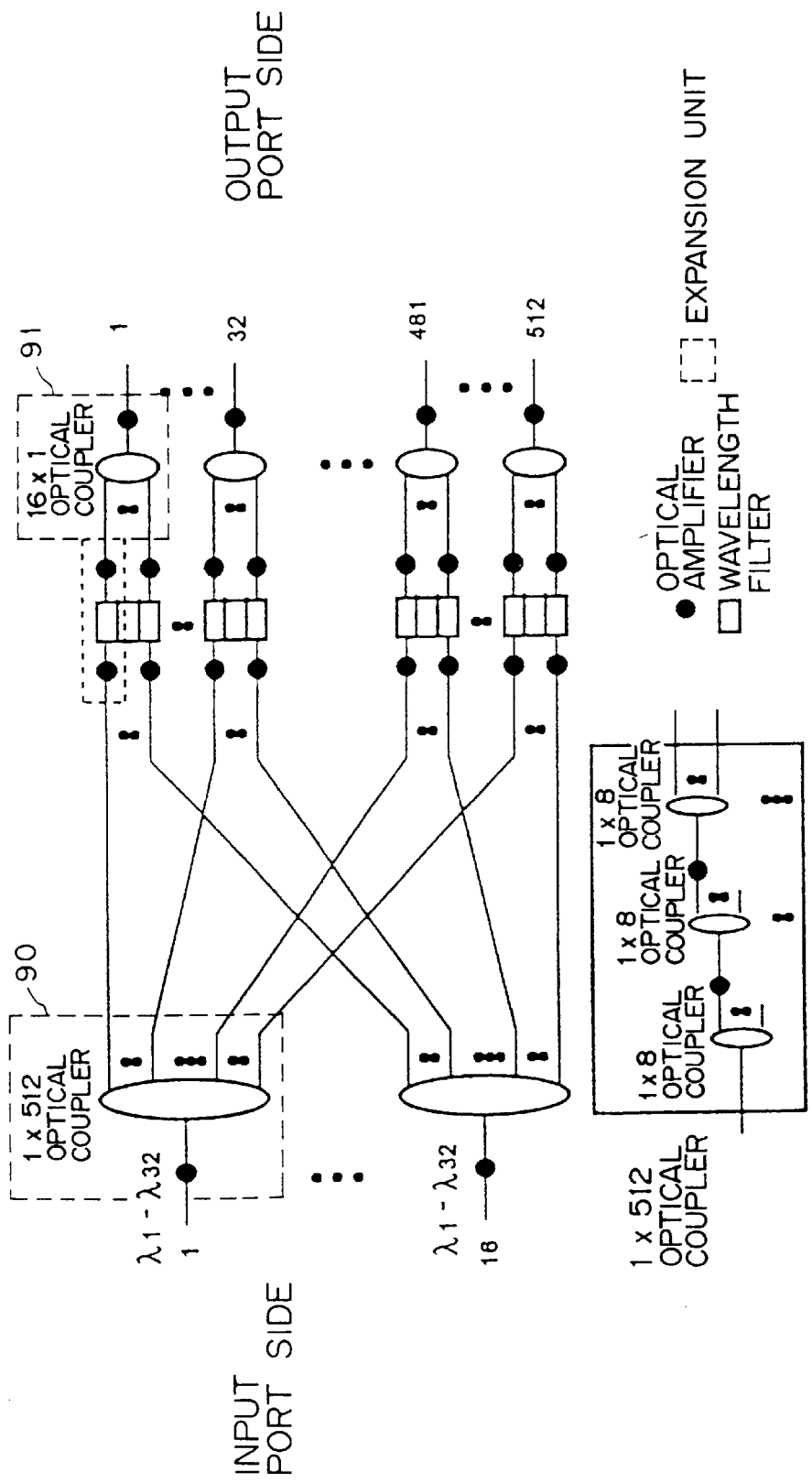
FIG. 12 is a schematic diagram exemplifying the configuration to which expandability is given by adding optical amplifiers to the wavelength selecting unit shown in FIG. 3B.

FIG. 12 exemplifies the configuration where optical amplifiers are added to provide expandability to the configuration of the wavelength selecting unit shown in FIG. 3B.

This figure exemplifies the structure where expandability is given to the structure of the wavelength selecting unit shown in FIG. 3B by adding optical amplifiers.

This figure depicts the structure of the wavelength selecting unit, which is applied to the wavelength converting type optical XC. That is, 512 output ports are arranged in order to output optical signals having respective wavelengths included in an input wavelength-multiplexed optical signal from respective output ports. The optical coupler 90 arranged on the input side has a 1×512 configuration in correspondence with the number of output ports. That is, the wavelength-multiplexed optical signal where the optical signals having wavelengths λ1 through λ32 are multiplexed is used as one input, and is split into 512 identical wavelength-multiplexed optical signals. The reason why the optical coupler 90 has 512 outputs is that the number of outputs ports of the wavelength selecting unit shown in FIG. 12 is 512. Each of the split signals is amplified by an optical amplifier, and is input to a wavelength filter. The wavelength filter selects the optical signal having a desired wavelength from the input wavelength-multiplexed optical signal, and outputs the selected signal. The optical signal output from the wavelength filter is amplified by an optical amplifier, input to a 16×1 optical coupler, coupled, and transmitted from the output ports. The reason why the number of input ports of the optical coupler 91 is 16 is that the number of input ports of the wavelength selecting unit shown in FIG. 12 is 16.

There are a total of four locations at which optical amplifiers are arranged: the location on the input port side (in order to compensate for the loss caused in a transmission line), the location between the 1×512 optical coupler 90 and the wavelength filter (in order to compensate for the loss caused in the 1×512 optical coupler 90), the location between the wavelength filter and the 16×1 optical coupler 91 (in order to compensate for the loss caused in the wavelength filter), and the location on the output port side (in order to compensate for the loss caused in the 16×1 optical coupler 91). An optical amplifier for compensating for loss is arranged also in the 1×512 optical coupler 90 if needed. By way of example, for an approximately 1×512 coupler, 1×8 optical couplers are normally arranged in three stages and are connected as shown in the bottom of FIG. 12. In such a case, optical amplifiers are also arranged between the first and second stage, and between the second and third stages. Namely, in this example, the total number of the locations at which optical amplifiers are arranged is 6. Here, the wavelength filter is a filter for selecting one desired wavelength from an input wavelength-multiplexed optical signal. Examples include an acousto-optic filter or a fiber Fabry-Pérot filter, etc. In this structure, a wavelength filter must be added as the number of ports or the number of wavelengths increases. Therefore, an optical amplifier is arranged at each input/output port of the wavelength filter similar to the fixed wavelength type of FIG. 10, that is, an optical amplifier, a wavelength filter, and an optical amplifier are sequentially added as an expansion unit. For the input/output port, an optical amplifier and a 1×512 optical coupler, and a 16×1 optical coupler and an optical amplifier, are respectively arranged as expansion units.

Figure 13:
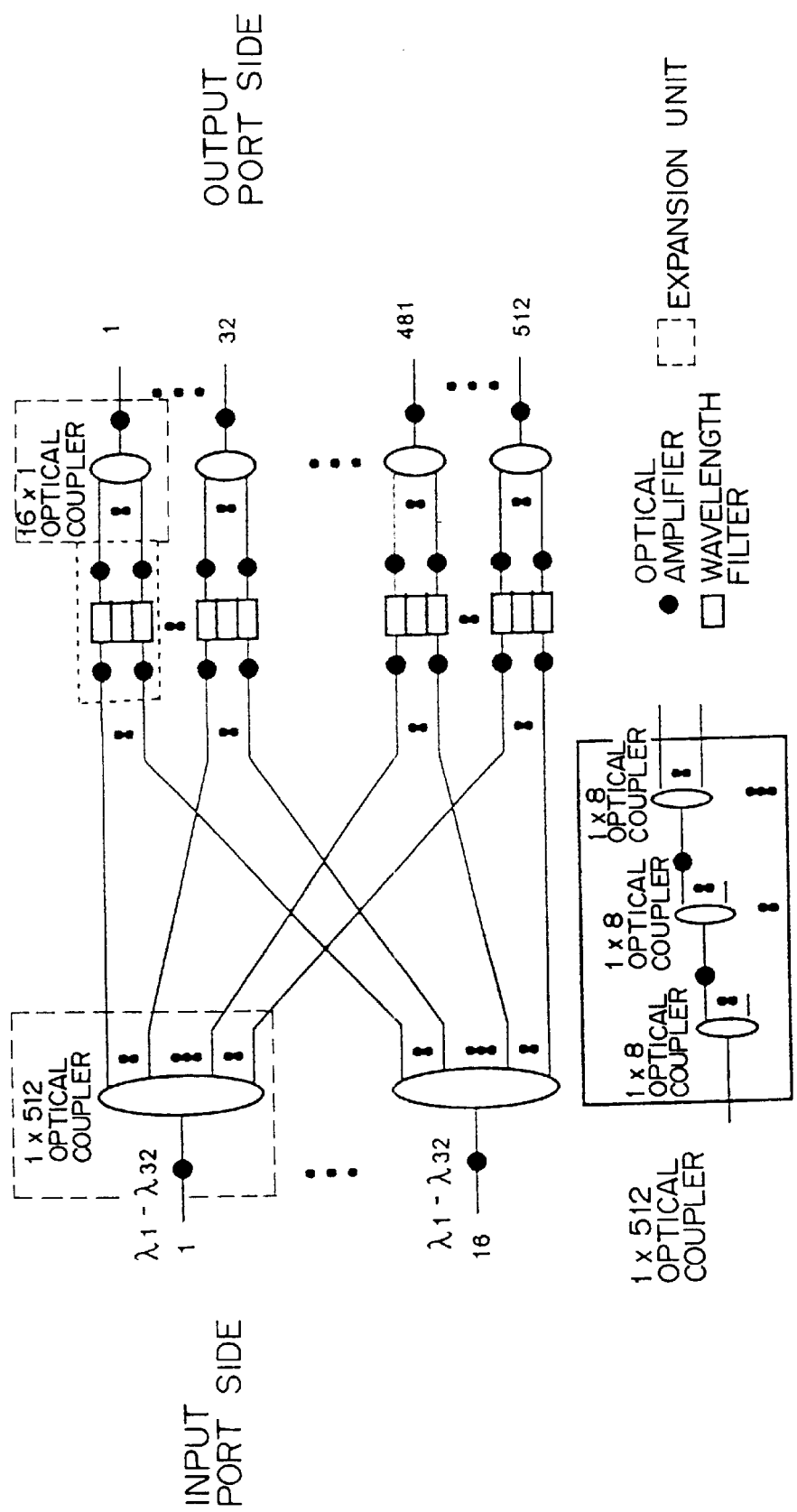
FIG. 13 is a schematic diagram exemplifying a modification of the expansion unit included in the configuration shown in FIG. 12 (No. 1)
Figure 14:
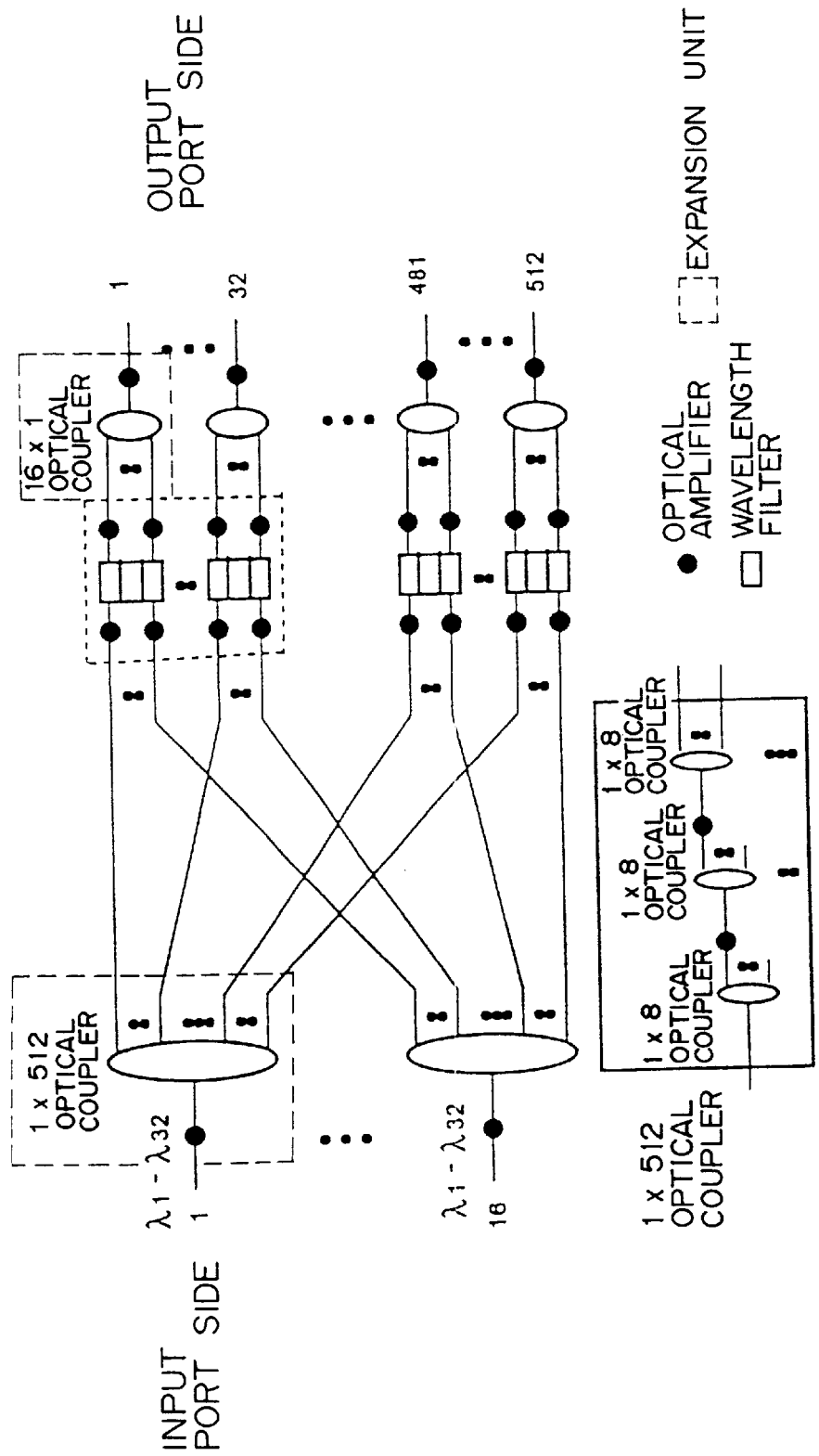
FIG. 14 is a schematic diagram exemplifying a modification of the expansion unit in the configuration shown in FIG. 12 (No. 2).

FIGS. 13 and 14 exemplify the modifications to the expansion unit of FIG. 12.

In FIG. 12, the expansion unit is set on the basis of one wavelength filter. However, the expansion units shown in FIGS. 13 and 14 can be set by integrating a plurality of wavelength filters into one optical module with an integration method.

In FIG. 13, both a pair of an optical amplifier and a 1×512 optical coupler, and a pair of a 16×1 optical coupler and an optical amplifier, are respectively used as expansion units in a similar manner as in FIG. 12. At the same time, 16 combinations of an optical amplifier, a wavelength filter, and an optical amplifier, which are connected to one 16×1 optical coupler, are used as one expansion unit. As described above, a unit including more wavelength filters, etc. can be used as an expansion unit by using the technique for integrating optical elements. Therefore, the operations such as wiring between optical elements, determining an arrangement at the time of an expansion, etc. can be simplified.

For example, in FIG. 13, 32 output ports must be added if the number of input ports is attempted to be increased from 15 to 16. (This corresponds to the number of multiplexed wavelengths 32). In this case, 32 expansion units of the 16×1 optical coupler on the output side must be increased. In the meantime, in the configuration shown in FIG. 12, 16×32=512 expansion units of the wavelength filter must be added. However, since 16 wavelength filters are currently arranged as one expansion unit in the configuration shown in FIG. 13, the number of newly required expansion units will be 32. As described above, the number of expansion units to be prepared at the time of expansion can be significantly reduced by using a plurality of wavelength filters as one expansion unit. This greatly contributes to the improvements of operation efficiency and reliability.

As the structure of the 1×512 optical coupler, 1×8 optical couplers are arranged in three stages, and are connected in a similar manner as in FIG. 12, and optical amplifiers are arranged between the stages.

FIG. 14 is a schematic diagram showing the structure where an expansion unit is configured by further integrating wavelength filters.

A pair of an optical amplifier and a 1×512 optical coupler is adopted as the expansion unit on the input side, while a pair of a 16×1 optical coupler and an optical amplifier is adopted as the expansion unit on the output side. Furthermore, 1×8 optical couplers are arranged in three stages as a 1×512 optical coupler, and optical amplifiers are arranged between the couplers.

As the expansion unit of the wavelength filter, 16×32=512 wavelength filters are integrated, and optical amplifiers are arranged on the input and output sides of the respective wavelength filters. The expansion unit is configured by integrating a number of wavelength filters as described above, so that the number of expansion units of the wavelength filters required for increasing a number of input/output ports can be reduced. As a result, the operation efficiency and reliability can be improved. Especially, if the number of input ports is attempted to be increased from 15 to 16 in FIG. 14, 32 more output ports are added. However, for the expansion unit of the wavelength filter in FIG. 14, one expansion unit includes 32 output ports. As a result, the number of expansion units of the wavelength filter required for expansion is only one.

The above explanation is provided by using particular numerical values as the numbers of input/output ports of the optical switch unit and the wavelength selecting unit, and the configurations of the optical switch and the optical coupler. However, the present invention can be applied without being limited to these particular values. These values must be suitably set by a skilled artisan using the present invention.

As described above, in a three-stage optical switch circuit network, an optical amplifier is arranged at each input/output ports of each optical switch in the first and third stages, an optical amplifier, an optical switch, and an optical amplifier are sequentially added as an expansion unit; or a 1×k switch and a k×1 switch ("k" is a natural number) are respectively arranged at each output port of each switch in the first stage and each input port of each switch in the third stage, and a plurality of 1×k switches and a plurality of k×1 switches, which are connected to each expansion unit in the first and third stages, are used as an expansion unit, so that a configuration with expandability can be implemented. It greatly contributes to the improvement of the performance of the optical transmission system employing this configuration.

Additionally, in a five-stage optical switch circuit network, an optical amplifier is arranged at each input/output port of each optical switch in the first and fifth stages, and at each output port of each optical switch in the second stage and each input port of each optical switch in the fourth stage; an expansion unit (in the first and fifth stages) composed of an optical amplifier, an optical switch, and an optical amplifier, an expansion unit (in the second stage) which is connected to the expansion unit in the first stage and is composed of an optical switch and an optical amplifier, and an expansion unit (in the fourth stage) which is connected to the expansion unit in the fifth stage and is composed of an optical amplifier and an optical switch, are sequentially added; or a 1×k switch and a k×1 switch are respectively arranged at each output port of each switch in the second stage and each input port of each switch in the fourth stage, and a plurality of 1×k switches and a plurality of k×1 switches, which are connected to each expansion unit in the second and fourth stages, are sequentially added as an expansion unit in the third stage, so that a configuration with expandability can be implemented. It greatly contributes to the improvement of the performance of the optical transmission system employing this configuration.

Furthermore, in the wavelength selecting unit using a wavelength filter or a multi-wavelength filter, an optical amplifier and an optical coupler, an optical coupler and an optical amplifier, or one or a plurality of optical amplifiers, a multi-wavelength filter (or a wavelength filter), and an optical amplifier, are sequentially added as an expansion unit, thereby implementing a configuration with expandability. It greatly contributes to the improvement of the performance of the optical transmission system employing this configuration.

What is claimed is:

1. An optical switch, which has a wavelength-multiplexed optical signal input from a plurality of ports, for routing the optical signal, and outputting the optical signal from a plurality of ports, comprising:

a routing element, comprising a k×2k ("k" is a natural number) optical switch or a 2k×k optical switch, selectively routine an optical signal having a particular wavelength, which is included in an input optical signal; and an optical amplifying unit amplifying the input optical signal or the optical signal having the particular wavelength, wherein said routing element and said optical amplifying unit are combined to configure an expansion unit, and whereby a switching capacity of the optical switch can be expanded by increasing the number of expansion units to be arranged.

2. The optical switch according to claim 1, wherein said routing element is implemented by connecting a 1×k ("k" is a natural number) optical switch and a k×1 optical switch.

3. The optical switch according to claim 1, wherein said routing element is a wavelength filter.

4. The optical switch according to claim 3, wherein said routing element is an acousto-optic filter.

5. The optical switch according to claim 3, wherein said wavelength filter is a fiber Fabry-Pérot filter.

6. An optical switch configured by a three-stage optical switch circuit network each of whose stages includes a plurality of optical space switches, comprising:

an optical amplifier arranged at each input/output port of optical space switches in first and third stages, wherein a switching capacity of the optical switch can be expanded by using an optical space switch and optical amplifiers on both of input/output sides of the optical space switch as an expansion unit.

7. An optical switch configured by a three-stage optical switch circuit network each of whose stages includes a plurality of optical space switches, comprising:

a 1×k ("k" is a natural number) optical switch arranged at each output port of an optical space switch in a first stage; and a k×1 optical switch arranged at each input port of an optical space switch in a third stage, wherein a switching capacity of the optical switch can be expanded by using a 1×k optical switch and a k×1 optical switch, which are connected to one optical space switch in the first and third stages, as an expansion unit in a second stage.

8. An optical switch configured by a three-stage optical switch circuit network each of whose stages includes a plurality of optical space switches, comprising:

an optical amplifier arranged at each input/output port of one optical space switch in first and third stages;

a 1×k ("k" is a natural number) optical switch arranged at each output port of an optical switch in the first stage; and a k×1 optical switch arranged at each input port of an optical space switch in the third stage, wherein a switching capacity of the optical switch can be expanded by using a 1×k optical switch and a k×1 optical switch, which are connected to expansion units in the first and third stages, as an expansion unit in a second stage, and using an optical space switch and optical amplifiers on both of input/output sides of the optical space switch as expansion units in the first and third stages.

9. An optical switch configured by a five-stage optical switch circuit network each of whose stages includes a plurality of optical space switches, comprising:

a first optical amplifier which is arranged at each input/output port of optical space switches in first and fifth stages, and configures expansion units in first and fifth stages by being combined with the optical switches;

a second optical amplifier which is arranged at each output port of an optical space switch in a second stage, and configures an expansion unit by being combined with the optical space switch; and a third optical amplifier which is arranged at each input port of an optical space switch in a fourth stage, and configures an expansion unit by being combined with the optical space switch, wherein a switching capacity of the optical switch can be expanded by sequentially increasing the numbers of the respective expansion units.

10. An optical switch configured by a five-stage optical switch circuit network each of whose stages includes a plurality of optical space switches, comprising:

a 1×k ("k" is a natural number) optical switch arranged at each output port of an optical space switch in a second stage; and a k×1 optical switch arranged at each input port of an optical space switch in a fourth stage, wherein a switching capacity of the optical switch can be expanded by using said 1×k optical switch and said k×1 optical switch, which are connected to the optical space switches in the second and fourth stages, as an expansion unit in a third stage.

11. An optical switch configured by a five-stage optical switch circuit network each of whose stages includes a plurality of optical space switches, comprising:

a first optical amplifier which is arranged at each input/output port of optical space switches in first and fifth stages and configures expansion units in the first and fifth stages by being combined with the optical space switches;

a second optical amplifier which is arranged at each output port of an optical space switch in a second stage, and configures an expansion unit by being combined with the optical space switch;

a third optical amplifier which is arranged at each input port of an optical space switch in a fourth stage, and configures an expansion unit by being combined with the optical space switch;

a 1×k ("k" is a natural number) optical switch arranged at each output port of the optical space switch in the second stage; and a k×1 optical switch arranged at each input port of the optical space switch in the fourth stage, wherein a switching capacity of the optical switch can be expanded by using a 1× optical switch and a k×1 optical switch, which are connected to the expansion units in the second and fourth stages, as an expansion unit in a third stage, and by sequentially increasing the numbers of the respective expansion units.

12. An optical switch which accommodates a plurality of input/output optical transmission lines, and includes a circuit for processing an input wavelength-multiplexed optical signal for each optical signal having each wavelength, comprising:

a wavelength filter for selecting an optical signal having at least one wavelength from the wavelength-multiplexed optical signal, and outputting the selected signal; and an optical amplifier arranged at each input/output port of said wavelength filter, wherein a processing capacity of the optical switch can be expanded by using a combination of said wavelength filter and said optical amplifier as an expansion unit, and increasing the number of expansion units.

13. The optical switch according to claim 12, wherein said expansion unit is implemented by combining a plurality of wavelength filters and a plurality of optical amplifiers.

14. The optical switch according to claim 12, wherein the circuit of the optical switch accommodates output ports (the number of which is obtained by multiplying the number of multiplexed wavelengths by the number of optical output transmission lines).

15. The optical switch according to claim 13, wherein the circuit of the optical switch accommodates output ports (the number of which is obtained by multiplying the number of multiplexed wavelengths by the number of optical output transmission lines).

16. The optical switch according to claim 12, further comprising:

an optical coupler arranged on an input optical transmission line side; and an optical amplifier arranged on an input side of said optical coupler, wherein an expansion unit is configured by combining said optical coupler and said optical amplifier, and the number of expansion units is increased, so that a processing capacity of the optical switch can be expanded.

17. The optical switch according to claim 12, further comprising:

an optical coupler arranged on an optical output transmission line side; and an optical amplifier arranged on an output side of said optical coupler, wherein an expansion unit is configured by combining said optical coupler and said optical amplifier, and the number of expansion units is increased, so that a processing capacity of the optical switch can be expanded.

18. The optical switch according to claim 13, further comprising:

an optical coupler arranged on an input optical transmission line side; and an optical amplifier arranged on an input side of said optical coupler, wherein an expansion unit is configured by combining said optical coupler and said optical amplifier, and the number of expansion units is increased, so that a processing capacity of the optical switch can be expanded.

19. The optical switch according to claim 14, further comprising:

an optical coupler arranged on an input optical transmission line side; and an optical amplifier arranged on an input side of said optical coupler, wherein an expansion unit is configured by combining said optical coupler and said optical amplifier, and the number of expansion units is increased, so that a processing capacity of the optical switch can be expanded.

20. The optical switch according to claim 15, further comprising:

an optical coupler arranged on an input optical transmission line side; and an optical amplifier arranged on an input side of said optical coupler, wherein an expansion unit is configured by combining said optical coupler and said optical amplifier, and the number of expansion units increased, so that a processing capacity of the optical switch can be expanded.

21. The optical switch according to claim 15, further comprising:

an optical coupler arranged on an optical output transmission line side; and an optical amplifier arranged on an output side of said optical coupler, wherein an expansion unit is configured by combining said optical coupler and said optical amplifier, and the number of expansion units is increased, so that a processing capacity of the optical switch can be expanded.

22. The optical switch according to claim 14, further comprising:

an optical coupler arranged on an optical output transmission line side; and an optical amplifier arranged on an output side of said optical coupler, wherein an expansion unit is configured by combining said optical coupler and said optical amplifier, and the number of expansion units is increased, so that a processing capacity of the optical switch can be expanded.

23. The optical switch according to claim 15, further comprising:

an optical coupler arranged on an optical output transmission line side; and an optical amplifier arranged on an output side of said optical coupler, wherein an expansion unit is configured by combining said optical coupler and said optical amplifier, and the number of expansion units is increased, so that a processing capacity of the optical switch can be expanded.

24. An optical switch, which has a wavelength-multiplexed optical signal input from a plurality of ports, for routing the optical signal, and outputting the optical signal from a plurality of ports, comprising:

a routing element, comprising an optical space switch implemented by combining a plurality of k×2k ("k" is a natural number) optical switches, or a plurality of 2k×k optical switches, selectively routing an optical signal having a particular wavelength, which is included in an input optical signal; and an optical amplifying unit amplifying the input optical signal or the optical signal having the particular wavelength, wherein said routing element and said optical amplifying unit are combined to configure an expansion unit, and whereby a switching capacity of the optical switch can be expanded by increasing the number of expansion units to be arranged.

25. The optical switch according to claim 24, wherein said routing element is implemented by connecting a 1×k ("k" is a natural number) optical switch and a k×1 optical switch.

26. The optical switch according to claim 24, wherein said routing element is a wavelength filter.

27. The optical switch according to claim 26, wherein said routing element is an acousto-optic filter.

28. The optical switch according to claim 26, wherein said wavelength filter is a fiber Fabry-Perot filter.

29. An optical switch, which has a wavelength-multiplexed optical signal input from a plurality of ports, for routing the optical signal, and outputting the optical signal from a plurality of ports, comprising:

a routing element for selectively routing an optical signal having a particular wavelength, which is included in an input optical signal; and an optical amplifying unit amplifying the input optical signal or the optical signal having the particular wavelength, wherein said routing element and said optical amplifying unit are combined to configure an expansion unit, and whereby a switching capacity of the optical switch can be expanded by increasing the number of expansion units to be arranged, the routing element being a wavelength filter which is a fiber Fabry-Perot filter.

* * * * *

UNITED STATES PATENT AND TRADEMARK OFFICE
CERTIFICATE OF CORRECTION

| | |
|---|---|
| PATENT NO. : 6,154,583 | |
| DATED : November 28, 2000 | |
| INVENTOR(S) : Satoshi Kuroyanagi, et al. | |

It is certified that error appears in the above-identified patent and that said Letters Patent is hereby corrected as shown below:

<u>Column 17,</u>
Line 3, change "routine" to -- routing --.

Signed and Sealed this

Twenty-fifth Day of September, 2001

Attest:

*Nicholas P. Godici*

NICHOLAS P. GODICI
*Attesting Officer*  *Acting Director of the United States Patent and Trademark Office*